Patented Mar. 1, 1932

1,847,210

UNITED STATES PATENT OFFICE

PIO CACCIA, OF CHICAGO, ILLINOIS

PROCESS FOR MAKING AND FRESHENING CHEESE

No Drawing.   Application filed April 16, 1930. Serial No. 444,875.

The invention relates to the industrial production of cheese and a process of manufacturing the same, and more particularly it relates to a new process for utilizing old or fully ripened cheese as a base for the manufacture of a batch of new cheese.

It is well known that cheese finally becomes too hard to be salable or unusable after it ages for a considerable time. In most cases, such hard unsalable cheese still retains its original flavor and taste and also retains, in unimpaired strength, the micro-organisms or enzymes which produce the distinctive flavor and taste of any particular brand or make of cheese. Since softness is frequently the only desirable quality such aged cheese has lost, it is an object of the invention to provide a novel process or method by which old cheese can be freshened without impairing its original desirable qualities or permitting the acquisition of other qualities which would make the cheese unwholesome or change its original taste and flavor.

Another object of the invention is to provide a novel process of cheese manufacturing wherein a small amount of cheese of any selected brand or make may be combined with cheese ingredients and so treated that the entire mass, upon ripening, is of the same flavor, taste, and distinctive qualities as the original cheese had when first manufactured.

Still another object of the invention is the provision of a novel process or method of manufacturing cheese wherein a small amount of cheese, utilized as a base, will impart its distinctive qualities of taste and flavor to a batch of any desired amount by mixing the same with a predetermined amount of cheese materials and permitting the mixture to ripen under predetermined temperature and moisture conditions.

A further object is the provision of a novel process or method wherein old cheese is freshened, and any desired quantity of new cheese is manufactured by making the micro-organisms or enzymes of the old cheese available for ripening the new cheese and thereby imparting to the new cheese, when ripened, the identical qualities of the original cheese.

Many other objects and advantages of the methods and process herein described will be obvious to those skilled in the art from the disclosure herein given.

To this end my invention consists in the novel method and process herein described and more particularly pointed out in the claims.

The process involves, in general, three distinct steps, the first of which consists in providing a quantity of finely comminuted dry unsalable cheese as a base and mixing the same in a vat with pasteurized whey, the latter being acid in reaction. Cheese already ripened, and retaining its original freshness may be used, if desired, as a base instead of old, unsalable cheese.

The relative proportions of the whey and cheese will vary with the dryness of the cheese used as a base, but in practice it is found that a mixture of equal parts by weight of the cheese and the whey gives satisfactory results. The cheese is gradually softened as it is mixed with the whey in the vat, the softness being caused in part by the water contents of the whey and in part by the acid of the medium. The amount of the cheese and whey used depends upon the amount of cheese requiring refreshening, or it may depend upon the amount of new cheese desired. The whey is preferably kept at a temperature of 80° to 100° F., during the mixing process, with the comminuted cheese and the mixing is continued until a homogeneous paste of uniform consistency results.

The second step consists in pouring the homogeneous mass of whey and cheese, while still warm, into a quantity of pasteurized milk. The milk has been first pasteurized to approximately 165° F. and then cooled to about 90° F. Rennet extract is added to the milk, in the proportions of 10 c. c. to 100 pounds of milk, immediately before the homogeneous mass of cheese and whey is added. After adding the rennet extract, the milk is thoroughly stirred to disseminate the extract therethrough and the mixture of whey and cheese is then added to the milk. The mixture is stirred for approximately five minutes to insure immediate, thorough mixing before the rennet has acted to coagulate the milk.

The mass is permitted to stand quiescent for a length of time sufficient to permit the rennet to coagulate the milk. In most cases one hour is sufficient time to permit such coagulation to be thoroughly complete at the end of which time the mass has become firm by reason of the coagulation of the milk. The thoroughly disseminated particles of milk thus coagulated produce a smooth, homogeneous mixture which would not be the result if the mixing or stirring of the milk with the paste was attempted after coagulation of the milk had started.

The third step consists in applying pressure to the mass to expel the surplus fluid contained in the acid whey and then placing the compressed mass in storage to ripen under predetermined temperature and moisture conditions. The whey and the milk together contain all of the requisite nutritive ingredients of cheese manufacturing, as well as the ingredients which enrich the freshened cheese, deficient in nutritive substances or in softness. The whey, being acid, in no way retards the coagulation of the milk and in many mixtures assists in the acceleration of coagulation of the milk.

The thorough mixing of the mass of comminuted cheese, whey, and milk under the temperature conditions described, is an important feature of the invention since incipient coagulation of the milk does not start until the thorough mixing has been completed. The method or process which enables an accurate control of the proportions of nutritive substances contained in the new cheese to be maintained and the postponement of the coagulation until thorough mixing is effected are also important and distinctive features, inasmuch as smoothness and uniformity of the product result which would otherwise be impossible where old cheese is used as an ingredient.

Still another important feature is the destruction by pasteurizing of all micro-organisms and enzymes of the whey and milk contents before mixing the cheese base therewith. The cheese base not having been pasteurized, the mixture contains only those particular kinds of enzymes or micro-organisms which give the cheese base its particular flavor and taste. The ripening occurs under predetermined conditions most favorable for the growth and propagation of the micro-organisms and enzymes present in the mixture and since there are no other micro-organisms or enzymes present during the ripening process under said predetermined conditions the resulting cheese product has the identical flavor and taste and qualities upon ripening that the basic cheese had when fresh.

The amount of pressure to which the paste is subjected depends upon the quality of the cheese which is being freshened and provided; for example, if Roquefort cheese is freshened or otherwise used as a base, only a slight pressure is exerted and the molds of the Roquefort cheese base are preserved to ripen the new mass and give the latter exactly the same taste and flavor as the original cheese had. The addition of the pasteurized whey and the pasteurized milk provide a substantially increased quantity of nutritive ingredients and it is possible in freshening a small amount of old cheese, to provide a mixture of any desired quantity which, upon ripening, results in a Roquefort cheese of the same identical flavor and taste. Since micro-organisms or enzymes contained in a particular brand of cheese produced its flavor and taste, it is found that by making the mixture as hereinbefore described and subjecting the same to the proper moisture and temperature conditions under which the particular organisms or enzymes thrive and permitting the same to ripen for the necessary time, the old cheese is not only freshened but a new mass of cheese, much larger in quantity, is produced having the same flavor and freshness as the old cheese originally had.

The method adapts itself to any kind of cheese by varying the pressure to which the final mixture is subjected and permitting the mixture to ripen under proper temperature and moisture conditions. Roquefort cheese, for example, should be permitted to ripen in a damp, cool place, underground, caves being frequently used for this purpose. As another example, in the cheese known as Parmesan the same process may be used as above described, but since the peculiar flavor of this cheese is due to bacilli, rather than to molds, it is especially desirable to prevent atmospheric micro-organisms from acting upon the Parmesan paste. A high degree of pressure is exerted upon the Parmesan paste, following which it is placed in a hot, dry room or receptacle so that a crust quickly forms on the exterior of the mass, preventing the entrance of any of the atmospheric micro-organisms, thereby leaving the bacilli and enzymes as the only constituents ripening this cheese and affecting its flavor.

Thus it will be seen that the invention provides a method and process suitable for similarly treating all grades of cheese, the completed paste being subjected to predetermined moisture and temperature conditions in accordance with the requirements of the particular brand of cheese.

What I claim as new and desire to secure by Letters Patent is:

1. The process herein described of manufacturing and freshening cheese which consists in preparing a batch of finely comminuted cheese as a base, mixing pasteurized whey maintained at a temperature of 80 to 100 degrees Fahrenheit with the cheese to form a paste, said whey being acid in reaction, adding rennet extract to a quantity of milk in the proportions of 10 c. c. of extract to 100 pounds of milk, said milk having been pasteurized at a temperature of 165 degrees Fahrenheit and cooled to aproximately 90 degrees Fahrenheit when the extract is added, thoroughly mixing the milk with the paste immediately following the addition of the extract and permitting the mass to stand until the milk coagulates.

2. The process herein described of manufacturing and freshening cheese which consists in preparing a batch of finely comminuted cheese as a base, mixing pasteurized whey maintained at a temperature of 80 to 100 degrees Fahrenheit with the cheese to form a paste, said whey being acid in reaction, adding rennet extract to a quantity of milk in the proportions of 10 c. c. of rennet to 100 pounds of milk, said milk having been pasteurized at a temperature of 165 degrees Fahrenheit and cooled to approximately 90 degrees Fahrenheit when said extract is added, thoroughly mixing the milk with the paste immediately following the addition of the rennet, permitting the mass to stand quiescent until the milk coagulates and then compressing the mass to remove the surplus fluid.

3. The process herein described of manufacturing and freshening cheese which consists in preparing a batch of finely comminuted cheese as a base, mixing pasteurized whey maintained at a temperature of 80 to 100 degrees Fahrenheit with the cheese to form a paste, said whey being acid in reaction, adding rennet extract to a quantity of milk in the proportions of 10 c. c. of rennet to 100 pounds of milk, said milk having been pasteurized at a temperature of 165 degrees Fahrenheit and cooled to approximately 90 degrees Fahrenheit when the rennet is added, thoroughly mixing the milk with the paste immediately following the addition of the rennet, permitting the mass to stand until the milk coagulates, compressing the mass to remove surplus fluid, and then permitting the mass to ripen under predetermined temperature and moisture conditions.

In witness whereof, I hereunto subscribe my name this 12th day of April A. D., 1930.

PIO CACCIA.